May 23, 1961 D. A. VAN OORT 2,985,047
TOOL WITH CAM-ACTUATED JAW CLOSING MEANS
Filed March 13, 1959 4 Sheets-Sheet 1
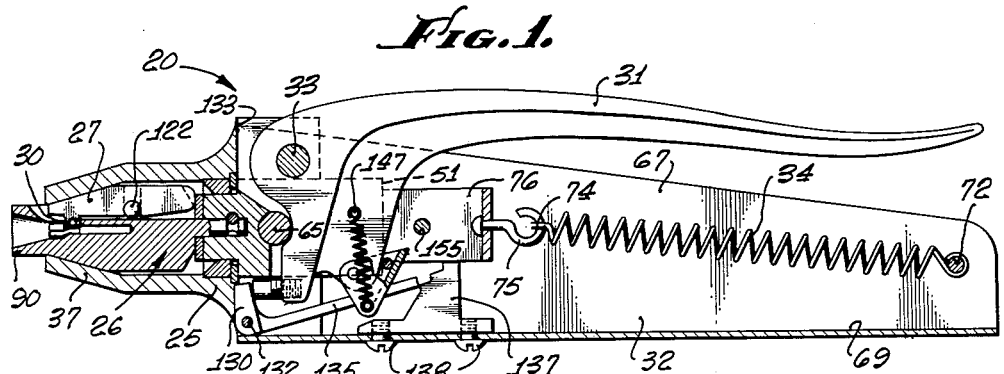
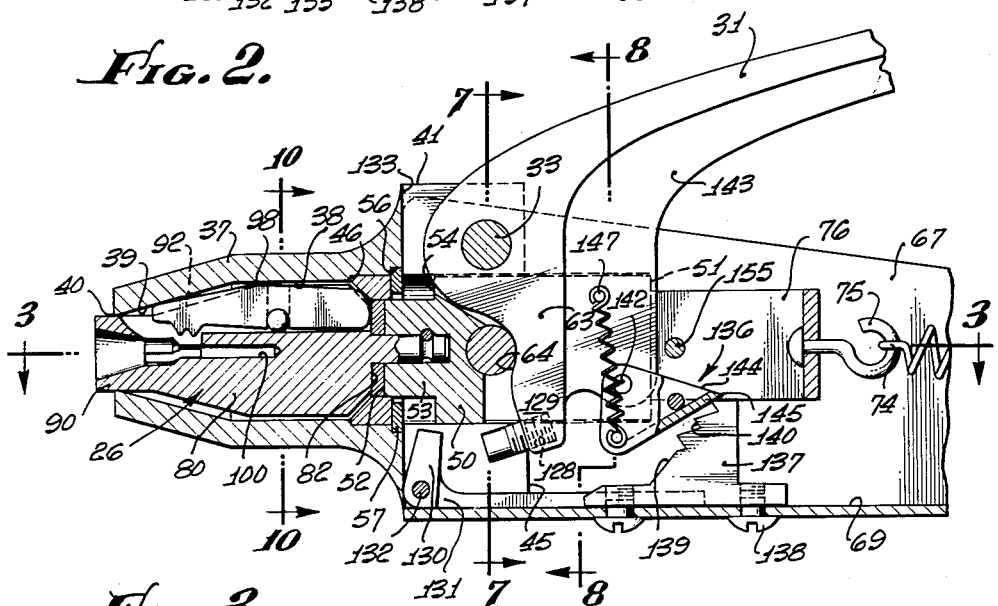
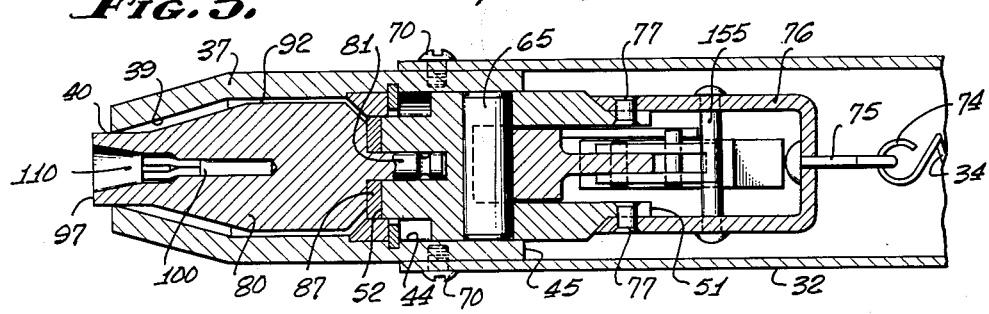
INVENTOR.
DERK ADRIAN VAN OORT
BY
Huebner & Worrel
ATTORNEYS.

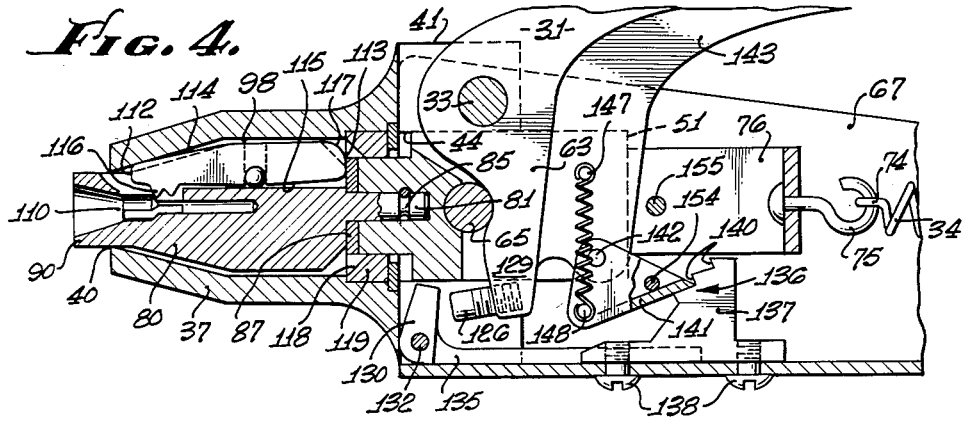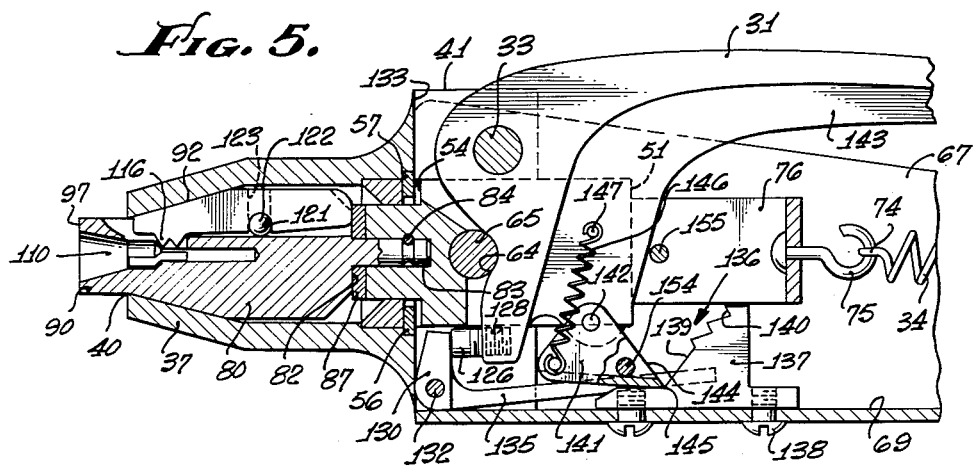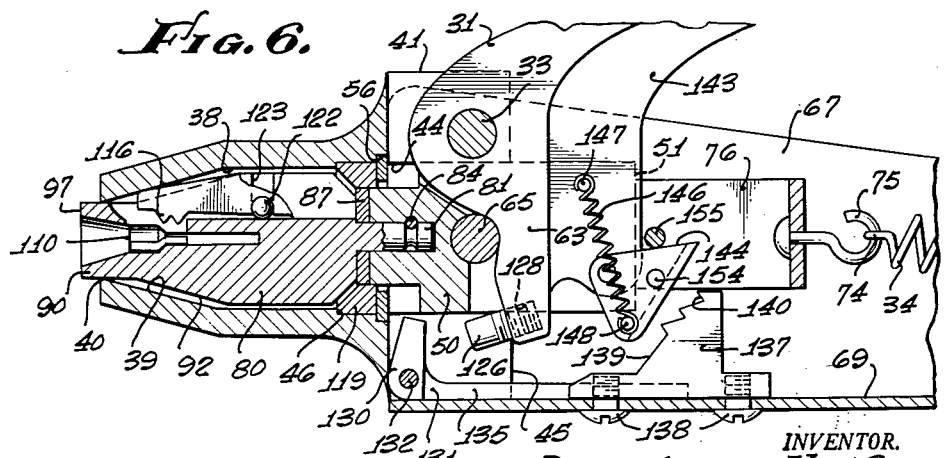

May 23, 1961  D. A. VAN OORT  2,985,047
TOOL WITH CAM-ACTUATED JAW CLOSING MEANS
Filed March 13, 1959  4 Sheets-Sheet 3

INVENTOR.
DERK ADRIAN VAN OORT
BY
Huebner & Worrel
ATTORNEYS.

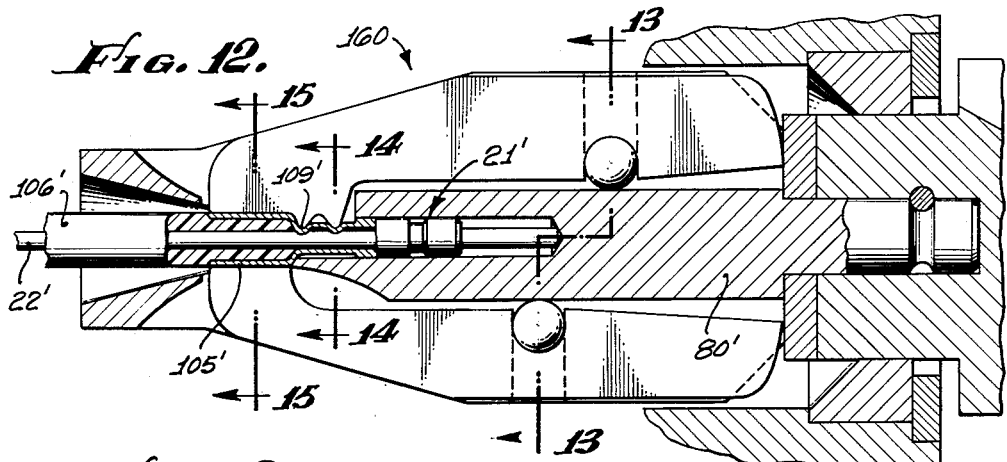
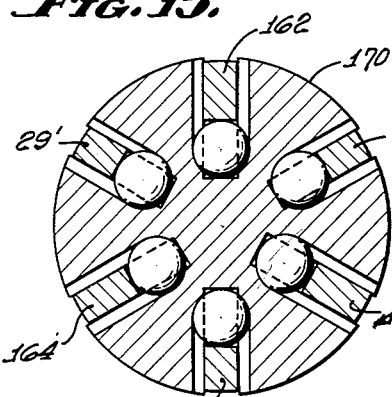
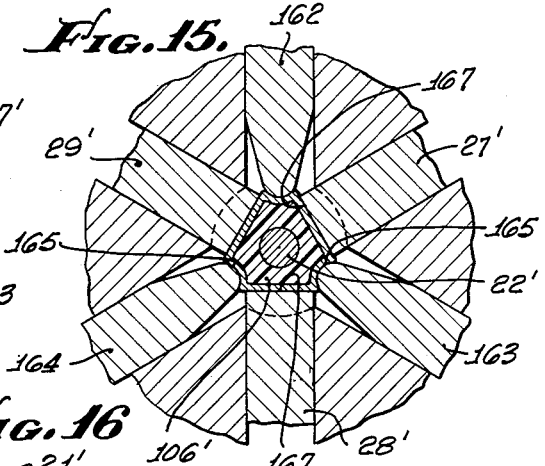
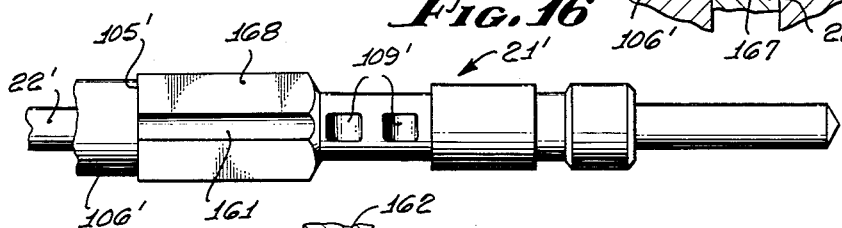
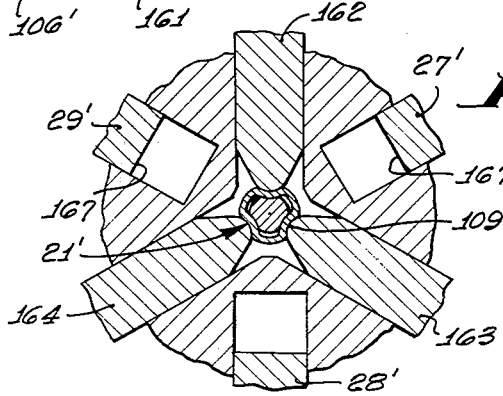

United States Patent Office 2,985,047
Patented May 23, 1961

2,985,047
TOOL WITH CAM-ACTUATED JAW CLOSING MEANS

Derk Adrian Van Oort, Whittier, Calif., assignor to Cannon Electric Company, Los Angeles, Calif., a corporation of California Filed Mar. 13, 1959, Ser. No. 799,354

9 Claims. (Cl. 81—15)

This invention relates to a tool having converging jaws. The invention is especially advantageous when adapted as a crimping tool for securing a contact terminal upon the end of a conductor wire.

It is an object of this invention to provide an improved tool having a plurality of jaws which are caused to converge and diverge by an axially reciprocable actuator, the actuator being operatively associated with a pivotal handle of the tool.

Another object of this invention is to provide an improved jaw tool having ratchet means for requiring completion of converging movement of the jaws.

A specific object of this invention is to provide a crimping tool in which the crimping jaws are caused to converge and diverge by axial movement of the jaws within a collet, this tool being particularly adapted to crimp a contact terminal upon the end of a conductor wire.

Still another object of this invention is to provide a crimping tool of the above mentioned character which is rugged in construction and highly effective and reliable in operation.

Further objects and advantages of this invention will appear during the course of the following part of this specification wherein the details of construction and mode of operation of two preferred embodiments of the invention are described with reference to the accompanying drawing, in which:

Fig. 1 is a longitudinal central section through a crimping tool of this invention, the same being shown with the parts thereof disposed in a fully closed position;

Fig. 2 is a longitudinal central section through the crimping tool showing the parts thereof disposed in fully open position;

Fig. 3 is a longitudinal section taken on line 3—3 of Fig. 2;

Fig. 4 is a longitudinal central section through the tool showing the parts thereof as they are disposed with respect to each other in a tool-closing phase;

Fig. 5 is a central longitudinal section through the crimping tool showing the parts thereof in a near closed phase;

Fig. 6 is a longitudinal section through the crimping tool showing the parts thereof in a tool-opening phase, beyond that of Fig. 1;

Figure 7:
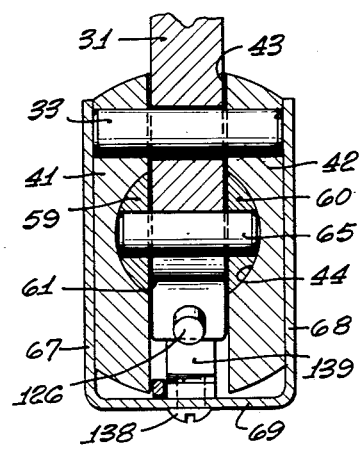
Figure 8:
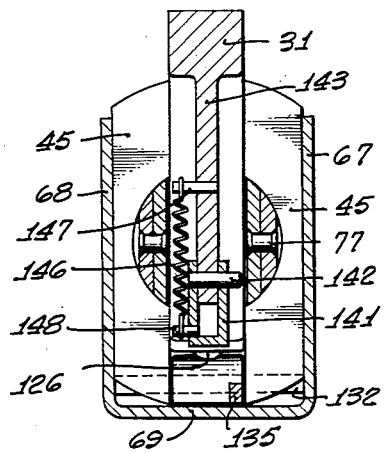
Figure 9:
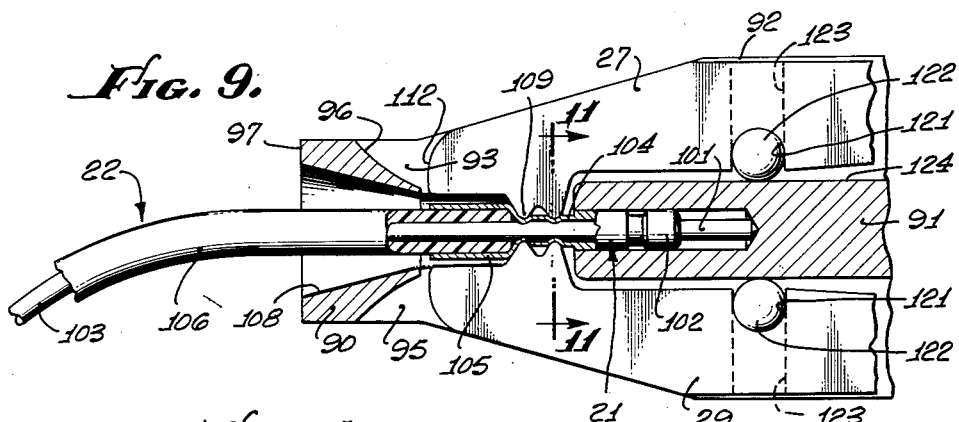
Figure 10:
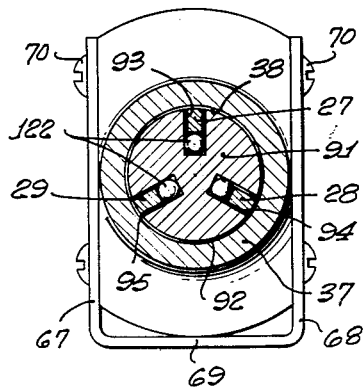
Figure 11:
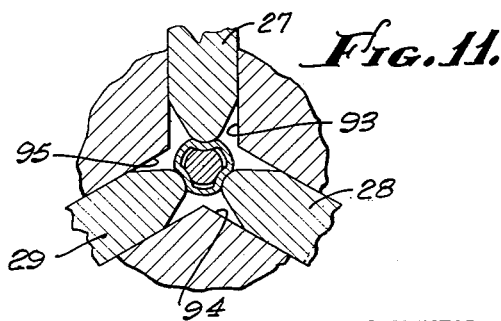

Figs. 7 and 8 are cross sections taken on lines 7—7 and 8—8, respectively, in Fig. 2;

Fig. 9 is an enlarged longitudinal central section of the forward end portion of the crimping tool showing the parts thereof as they are disposed in closed phase for crimping a contact terminal on the end of a conductor wire;

Fig. 10 is a cross section taken on line 10—10 of Fig. 2;

Fig. 11 is an enlarged detail section taken on line 11—11 of Fig. 9;

Fig. 12 is a longitudinal central section through the forward portion of another form of crimping tool embodying this invention;

Fig. 13 is a transverse section taken on line 13—13 of Fig. 12;

Figs. 14 and 15 are detail sections taken on lines 14—14 and 15—15, respectively, in Fig. 12; and Fig. 16 is a side elevation of a contact terminal secured upon the end of a conductor wire as with the crimping tool of Fig. 12.

Referring to the drawing in detail, there is shown in Figs. 1–11 inclusive a crimping tool, designated generally by reference numeral 20, the same being adapted to secure a contact terminal 21 (Fig. 9) upon the end of a conductor 22. The drawing shows the tool in a sequence of phases of its closing and opening operations, the order being from fully open position to closed position and back to fully open position, as follows: Fig. 2—fully open; Fig. 4—a closing phase; Fig. 5—a near closed phase; Figs. 1 and 9—fully closed; Fig. 6—a near open phase; and return to the fully open position of Fig. 2.

The crimping tool 20 comprises a tubular housing 25, an actuator 26 reciprocable in the housing, three jaw elements 27, 28 and 29 which are pivotally mounted in the housing on the actuator and presenting radially inwardly directed jaw surfaces 30, two handles 31 and 32, the handle 31 being pivotally mounted by a pin 33 in the housing for reciprocating the actuator to converge the jaw surfaces 30 as the handles approach each other, and a return spring 34 biasing the actuator in a rearward direction to provide divergence of the jaw surfaces to a tool-open position.

The housing 25 of the illustrated embodiment comprises a forward tubular collet portion 37 of circular cross section having an inside cylindrical wall 38 which continues as an inside conical wall 39 to an outer end opening 40. At its inner end portion, i.e. opposite the outer or forward open end 40, the housing extends as two flanges or legs 41 and 42 which define a vertically extending slot 43 therebetween. The housing has a cylindrical bore 44 formed therein extending axially from the inner end surface 45 of the housing to an inwardly facing annular shoulder 46 which defines the inner end of the cylindrical wall 38. Thus the housing has a continuous opening extending axially therethrough from open end 40 to inner end surface 45, the same being defined by the conical wall 39, cylindrical wall 38 and the inside surfaces of the flanges 41 and 42 which define the bore portion 44.

The actuator 26 of the illustrated embodiment comprises a cylindrical follower or plunger 50 slidable axially in the bore 44 and having an outer end surface 51 and an inner end surface 52. The inner end portion 53 of the plunger is of smaller diameter than the remaining portion of the plunger to define an annular shoulder 54 which faces in a direction toward the forward end of the tool. The inside wall of the housing has an annular groove 56 formed therein to receive a snap ring 57 for limiting the extent of movement of the plunger in a left-hand direction, as viewed in the drawing, when the shoulder 54 abuts the snap ring.

Plunger 50 is bifurcated to provide two side arms or branches 59 and 60 which define a slot 61 therebetween, the slot 61 being equal in width and aligned with the slot 43 of the housing. The aligned slots receive a lever arm portion 63 of handle 31, the handle being fulcrumed in the slot 43 of the housing by the pin 33. A curved recess or cam surface 64 is formed in the lever arm 63 for accommodating a pin 65 which extends through the side arms of the plunger whereby as the handle is depressed, its lever arm will engage the pin 65 to move the plunger in a direction toward the open end of the housing.

The other handle of the tool, i.e. handle 32, of the illustrated embodiment is of U-shaped cross section having side walls 67 and 68 and a bottom wall 69 for receiving the inner end portion of the housing, the housing being secured in the forward end of the handle 32 with screws 70 as shown best in Fig. 3. The illustrated embodiment is designed as a hand operated tool and its handle 32 is made to have a flat bottom wall whereby the tool may be rested upon a horizontal work surface to permit the operator to press down only on the handle 31 for performing a crimping operation. It is to be understood, of course, that the handles 31 and 32 may be parts of a machine which is power-actuated and operable other than by hand.

At its rearward end the handle 32 has a pin 72 extending between its side walls for attaching one end of the coil spring 34. The other end 74 of the spring is hooked to a clevis ring 75 on a U-shaped strap 76 which is secured as with rivets 77 to the plunger 50.

The actuator 26 comprises, in addition to the plunger 50, a cylindrical guide member 80 having a stem 81 extending axially from inner end surface 82 of the guide member, the stem being receivable in an axial bore 83 formed in the forward end surface of the plunger whereby the guide member is detachably secured to the plunger. A removable fastener in the form of a pin 84 extends through the plunger and tangentially through an annular groove 85 of the stem thereby to releasably secure the guide member on the forward end of the plunger. Reference numeral 87 designates a washer around the stem and disposed between the adjacent end surfaces of the guide member and the plunger.

The forward end portion 90 of the actuator guide member is cylindrical and slidable axially in the forward end opening 40 of the housing. A plurality of longitudinal slots are formed in the guide member to extend radially outwardly of the member from an axial hub portion 91 to the outside surface 92 of the guide member, there being three such slots 93, 94 and 95, disposed at 120° with respect to each other, for the tool 20. These slots receive the jaw elements 27, 28 and 29, respectively. Each slot is open in the inner end surface 82 of the guide member, and each slot terminates at its forward end at 96 inwardly of the forward end surface 97 of the guide member. Except for the forward cylindrical portion 90 which is slidable in the forward end opening of the housing, the cross-sectional dimensions of the guide member are less than those of the opposing inside wall portions of the tubular portion of the housing to leave a space 98 between the outside surfaces of the guide member and their opposing surface portions on the inside wall of the housing whereby the guide member is free to move axially in the housing, within limits as are explained hereinafter, without abutting against the inside walls of the housing.

Reference numeral 100 designates an opening which extends from the forward end surface 97 of the guide member to within the hub portion 91 for receiving the contact terminal 21 and an end portion of conductor 22 as shown best in Fig. 9. The particular contact terminal which is shown in the drawing for purposes of illustration is a pin type terminal as is used in conventional electrical connectors. It has a pin portion 101 and annular enlarged tubular portions 102 for receiving a wire core 103 of the conductor. The enlarged portions serve to secure the terminal within an insulation block of an electrical connector member as is well understood by those skilled in the art of electrical connectors. The terminal 21 continues from its enlargements 102 as a tubular neck portion 104 and thence as a sleeve or skirt portion 105 which circumscribes the end portion of insulation jacket 106 of the conductor. The axial opening 100 is of stepped configuration to accommodate the contact terminal, and its throat 108 is flared radially outwardly to provide for convenience in inserting a contact element into the opening. The crimping tool 20 is designed to grip the contact element only around its neck portion 104 to form indentations 109 in the neck portion which tightly engage the wire core of the conductor.

Each of the radial slots 93, 94 and 95 of the guide member is open in the forward end portion thereof at 110 to the contact receiving opening 100 whereby the jaw elements 27, 28 and 29 may reach into the opening 100 to engage the neck portion of the contact element for a crimping operation.

Referring now to the details of construction of the jaw elements 27, 28 and 29, the three jaw elements are substantially identical to each other and are formed as blades for reception in the radial slots of the guide member. Each blade has a forward end edge 112, a rearward end edge 113, an inclined outside edge portion 114, and an inside edge 115. There are teeth 116 on each jaw blade extending from the inside edge 115 for forming the indentations 109 in the contact element. The outside rearward corner 117 of each blade is rounded off as a cam surface to engage a conical taper 118 on a cam ring 119 which is held within the housing between annular shoulder 46 and the snap ring 57. The outside edge of each blade extends outwardly beyond the outside surface of the guide member whereby when the tool actuator is retracted, the cam corners 117 will slidably engage the conical taper of the cam ring 119 to deflect the rearward ends of the jaw blades radially inwardly of their slots to the position shown in Fig. 2.

Intermediate its ends, each jaw blade has a recess 121 extending inwardly from its inside edge 115 to accommodate a pivot ball 122 which is positioned in the inner end of a bore 123 formed in the guide member. The bore 123 and the ball 122 are of larger diameter than the width of a slot 93, the bore having its axis directed radially of the guide member and disposed in the medial plane of the slot 93 whereby the slot passes transversely through the bore. The bore also extends to the bottom wall 124 of the slot so that the ball rests on such bottom wall, the bottom walls of the several slots defining the outside limits of what has been referred to herein as the hub portion 91 of the guide member.

The depth of the recess 121 is slightly less than the diameter of the ball whereby it will be apparent that the jaw blade pivots on the ball in a seesaw fashion such that when the rearward ends of the jaw blades are urged inwardly by sliding engagement with the cam ring, the forward ends of the jaw blades will move outwardly or diverge from each other, and when the forward ends converge the rearward ends will diverge. Converging action of the jaw blades results from forward movement of the guide member and its jaw blades in the housing by sliding engagement of the outer inclined edge 114 of each jaw blade against the inside conical surface 39 in the forward end portion of the housing. It will be apparent, too, that the pivot balls 122 restrain their respective jaw blades against longitudinal movement in the guide slots.

As thus far described, it will be apparent that a crimping tool of this invention provides relatively large surfaces for interengagement of moving parts whereby wearing away of these surfaces will be substantially decreased. It is to be noted that the inclined outer surface 114 of each jaw blade matches the incline of the inside conical surface 39 of the housing with the result that when greatest force is called for to press the contact terminal into engagement with the stripped wire core of a conductor, the area of engagement between the housing and the jaws is at a maximum. It will be apparent also that even should wearing of parts occur in the life of the tool, such wearing will in no way detrimentally affect the crimping action.

The advantages of the tool of this invention stem in large part from the straight line action of the actuator, making the tool one which is readily adaptable to either a hand operated or power driven tool. Conventional crimping tools bend and deform the contact terminals and greatly increase the dimensions of the terminals in one or more directions in the crimp area. Multiple indenter tools of the type which are presently available on the market, do not crimp with any high degree of uniformity because the action of the indenters is not closely controlled and the indenters tend to wander away from their normal line of action. This lack of uniformity in conventional tools, which becomes more pronounced with wear, cannot properly be adjusted or compensated for and results in limiting the range of wire sizes that can be crimped with any high degree of success.

Control of the depth of the indentations 109 in a contact terminal and adjustment of the tool parts to accommodate contact terminals and conductor wires of various sizes is had through a stop in the form of a screw 126 which is turnable in a tapped bore 128 formed in the forward face of the free end portion 129 of the lever arm 63 of handle 31. When the handle 31 approaches handle 32, the adjustment screw will engage the rearwardly facing surface of an arm 130 of a lever 131 which is pivotally mounted as by a pin 132 in the lower end portion of the housing slot 43. The adjustment screw will swing the lever arm 130 forwardly in the housing until the lever arm strikes the bottom wall 133 of the slot thus to limit the extent to which the handle 31 may be moved downwardly thereby to limit forward movement of the actuator with a resulting limit on the extent of convergence of the jaw blades.

The crimping tool 20 is provided with means for requiring completion of converging movement of the working surfaces of the jaws before the handle 31 may be raised to open the jaws. For this purpose lever 131 is provided with a release arm 135 for tripping a ratchet assembly which is designated, generally, by reference numeral 136.

Ratchet assembly 136 comprises a ratchet block 137 which is fixed as with screws 138 upon the bottom wall of handle 32. The block has an upwardly and rearwardly inclined surface 139 facing forwardly in the tool and provided with a series of undercut notches 140. A pawl 141 is pivoted on a pin 142 which extends through a strengthening rib 143 of handle 31, the pawl being of U-shaped cross section to overlie the side surfaces of the strengthening rib, and being of triangular configuration to provide a cam surface 144 and a tooth end 145 for engagement in the notches 140. A small spring 146 is secured at one end 147 thereof to the handle 31 and at its other end to a pin 148 which extends out beyond a side surface of the pawl. The relationship of the spring and the pawl are such that when the pin 148 is forwardly past center of the pivot pin 142, during a crimping stroke of the handle 31, the spring will bias the pawl in a clockwise direction, as viewed in Figs. 2, 4 and 5 of the drawing. As the handle 31 approaches handle 32, the pawl tooth will ride downwardly over the edges of the notches 140, producing a click as it rides over each notch edge. Should an operator release handle 31 before it has been moved to its downwardmost position, the pawl tooth will engage the ratchet block in one of the notches 140, so that the handle may not be moved upwardly until the pawl has been rotated in a counterclockwise direction away from the ratchet block. Thus, the ratchet assembly requires completion of a jaw closing operation before the jaws of the tool may be opened.

A stop in the form of a pin 154 extends transversely of the pawl adjacent the pawl tooth and out beyond a side wall of the pawl where it will be engaged by the release arm 135 when the crimping tool is in its near closed position of Fig. 5. In the closing operation of the tool from the near closed phase of Fig. 5 to the fully closed phase of Fig. 1, the adjustment screw 126, by engagement with lever arm 130, lifts the release arm 135 thereby swinging the pawl in a counterclockwise direction to the position thereof shown in Fig. 1. Such counterclockwise swinging of the pawl will shift the lower end of the pawl rearwardly past center of its pivot pin 142, and the spring 146 will pull the pawl to its Fig. 1 position where the pawl is free to move upwardly without engaging the notches on the ratchet block. When next the handle 31 is released, whereby it will raise due to the rearward pull of the actuator by the return spring 34, the pawl will move upwardly to the near open position of Fig. 6.

There is a stop in the form of a pin 155 which extends transversely of the sides of the U-shaped strap 76. When the tool is in its near open phase of Fig. 6, cam surface 145 of the pawl will engage the pin 152. In the opening operation of the tool from the near open phase of Fig. 6 to the fully open phase of Fig. 2, the pawl will continue its upward movement with its cam surface 144 in sliding engagement with the stop pin 155 thereby to swing the pawl in a clockwise direction to the past center position thereof shown in Fig. 2. The pawl is then disposed to allow downward movement of the handle 31 for performing another crimping operation.

In view of the above it will be apparent that the adjustment screw 126 serves not only to control the extent of forward movement of the actuator so as to control the depth of the indentation crimps to be formed in the contact terminal, but also the adjustment screw serves with the lever 131 to control the release of the ratchet assembly.

Referring now to Figs. 12–16 inclusive, there is shown another embodiment of a crimping tool of this invention, the same being designated generally by reference numeral 160. Except for its jaws and guide member, the crimping tool 160 may be substantially identical in structure and mode of operation to the crimping tool 20 of Figs. 1–11. The crimping tool 160 is designed to crimp and form indentations 109' not only in the neck portion of the contact terminal 21' of Fig. 16, but also to form longitudinally extending indentations 161 in the sleeve or skirt portion 105' of the terminal whereby the terminal becomes crimped around the insulation jacket 106' of the conductor 22'. For this purpose the guide member 80' of crimping tool 160 has three jaw blades 162, 163 and 164 contained therein and operable similarly as the jaw blades 27, 28 and 29 of crimping tool 20. Each of the jaw blades 162, 163 and 164 are disposed intermediate a pair of jaw blades 27', 28' and 29', respectively, of tool 160, whereby the jaw blades 162, 163 and 164 are diametrically opposed to jaw blades 27', 28' and 29', respectively. Each of the jaw blades 162, 163 and 164 has a rounded tool surface 165 extending longitudinally thereof for engagement with the skirt of the contact terminal to form the indentations 161 simultaneously with the forming of indentations 109' by the teeth 116' of jaws 27', 28' and 29'.

To prevent the skirt portion of the contact terminal from being bulged outwardly between the indentations 161, the jaw blades 27', 28' and 29' have flat working surfaces 167 disposed forwardly of the indenter teeth 116' for engagement with the outside surface of the terminal skirt simultaneously with the forming of indentations 109' and 161. In the illustrated embodiment the jaw surfaces 167 compress the skirt radially inwardly between indentations 161 as flat portions 168 to constrict the terminal skirt around the insulation jacket of the conductor.

The free-floating character of the jaw blades in their slots and the alignment of the medial planes of the jaw blades with the center line of the contact terminal being crimped allows for wear to occur, during the life of the tool, along the working surfaces and cam edges of the blades without developing misalignment of the blades with respect to the article to be gripped or crimped.

For better illustrating the relationship of the size of a guide member of the illustrated crimping tools, the guide member 80' of crimping tool 160 is shown as being slightly greater in its largest cross-sectional dimension than the outside extent (outside edge 170) of the jaw blades. This has been done to make it clear that for the purposes of this invention it is necessary only that the guide member be so designed as to leave the corner edges 117 of the jaw blades exposed whereby they are free to ride on the tapered cam surface of the cam ring 119' during the operation of opening the tool, and to leave the inclined edges 114 exposed to ride on the long taper 39 of the housing during a crimping stroke.

While the instant invention has been shown and described herein, in what are conceived to be the most practical and preferred embodiments, it is recognized that departures may be made therefrom within the scope of the invention, which is therefore not to be limited to the details disclosed herein, but is to be accorded the full scope of the claims.

What I claim is:

1. A tool comprising a tubular housing having an open forward end, an actuator reciprocable axially in the housing, a lever arm pivotal on the housing and engageable with the actuator to move the actuator forwardly in the housing, means biasing the actuator rearwardly of the housing, the housing having a first inclined annular inside surface portion proximate its forward end and facing axially and rearwardly in the housing, the housing having a second inclined annular inside surface portion proximate its rearward end and facing axially and forwardly in the housing, the actuator having a plurality of radially extending and axially directed slots formed therein, each slot having a jaw blade positioned therein, the jaw blades being slidably engageable with said first inclined surface when the actuator is moved forwardly in the housing to converge the forward end portions of the jaw blade, the jaw blade being slidably engageable with said second inclined surface when the actuator is moved rearwardly in the housing to diverge the forward end portions of the jaw blades.

2. A tool according to claim 1, in which each slot contains a rounded pivot member at the inside extremity thereof, the jaw blades being in engagement with the pivot members, respectively, intermediate the ends of the jaw blades.

3. A tool according to claim 1, in which said actuator comprises a plunger portion for engagement with said lever arm, and a guide member releasably connected to the plunger and disposed in the forward portion of the housing and in axial alignment with the plunger.

4. A tool for crimping a tubular member around another member and comprising a tubular housing having an open forward end for reception of the member to be crimped, an actuator reciprocable in the housing, a pair of handles on the housing, one handle being pivotally connected on the housing and engageable with the actuator to move the actuator forwardly in the housing, means biasing the actuator rearwardly of the housing, the housing having a first inclined annular inside surface portion proximate its forward end and facing axially and rearwardly of the housing, the housing having a second inclined annular inside surface portion proximate its rearward end and facing axially and forwardly of the housing, the actuator having an annularly arranged series of uniformly spaced apart slots formed therein extending in an axial direction with respect to the actuator, a plurality of jaw blades disposed in said slots respectively, means in the slots for pivoting the jaw blades intermediate their ends, the jaw blades being slidably engageable with said first inclined surface when the actuator is moved forwardly in the housing to converge the forward end portions of the jaw blades for crimping said tubular member around said other member, the jaw blades being slidably engageable with said second inclined surface when the actuator is moved rearwardly in the housing to diverge the forward end portions of the jaw blades out of engagement with said tubular member.

5. A tool according to claim 4, in which the plurality of blades comprises two groups, the jaws of one group being disposed intermediate adjacent pairs of jaws of the other group respectively, the jaws of one group having indenter surfaces for forming crimps in the tubular member, the jaws of the other group having working surfaces for engagement with the outside of the tubular member to prevent outward bulging of the tubular member intermediate the crimps.

6. A tool according to claim 5, in which the jaws of one group are disposed diametrically opposite to the jaws of the other group respectively.

7. A tool comprising first and second handles and at least two jaws, the handles being pivotally mounted with respect to each other and operatively associated with the jaws whereby the jaws converge when the handles approach each other and the jaws diverge when the handles are moved apart, a lever fulcrumed with respect to one handle, means providing a ratchet surface on the first handle, said surface having a series of notches formed therein, a pawl pivotally mounted on the second handle for engagement in said notches, the pawl having a cam surface, a resilient member biasing the pawl to a first position where the pawl will engage said notches and to a second position past center of the first position and where the pawl will be free from engagement with the notches, said lever being operable to rotate the pawl from said first position toward said second position when the handles have been moved to a predetermined limit of approach, and a stop against which said cam surface rides to swing the pawl to said first position as the handles are being spread apart.

8. A tool according to claim 7, and comprising an adjustment screw engageable with said lever for limiting the extent to which the handles may be moved toward each other and for fulcruming the lever to engage said pawl.

9. A tool comprising a tubular housing having an open forward end, an actuator reciprocable axially in the housing, first and second handles on the housing, one handle being pivoted on the housing and engageable with the actuator to move the actuator forwardly in the housing, means biasing the actuator rearwardly in the housing, the housing having a first inclined annular inside surface portion proximate its forward end and facing axially and rearwardly in the housing, the housing having a second inclined annular inside surface portion proximate its rearward end and facing axially and forwardly in the housing, the actuator having a plurality of radially extending and axially directed slots formed therein, each slot having a jaw blade positioned therein, the jaw blades being slidably engageable with said first inclined surface when the actuator is moved forwardly in the housing to converge the forward end portions of the jaw blade, the jaw blade being slidably engageable with said second inclined surface when the actuator is moved rearwardly in the housing to diverage the forward end portions of the jaw blades, a lever fulcrumed with respect to one handle, means providing a ratchet surface on the first handle, said ratchet surface having a series of notches formed therein, a pawl pivotally mounted on the second handle for engagement in said notches, the pawl having a cam surface, a resilient member biasing the pawl to a first position where the pawl will engage said notches and to a second position past center of the first position and where the pawl will be free from engagement with the notches, said lever being operable to rotate the pawl from said first position toward said second position when the handles have been moved to a predetermined limit of approach, and a stop against which said cam surface rides to swing the pawl to said first position as the handles are being spread apart.

References Cited in the file of this patent

UNITED STATES PATENTS

| | | |
|---|---|---|
| 1,984,234 | Schmid | Dec. 11, 1934 |
| 2,369,180 | Rosenthal | Feb. 13, 1945 |
| 2,600,860 | Dupre | June 17, 1952 |
| 2,737,071 | Dioner | Mar. 6, 1956 |